United States Patent
Tatsuta

(10) Patent No.: US 11,994,469 B2
(45) Date of Patent: May 28, 2024

(54) SPECTROSCOPIC IMAGING APPARATUS AND FLUORESCENCE OBSERVATION APPARATUS

(71) Applicant: Sony Corporation, Tokyo (JP)

(72) Inventor: Hirokazu Tatsuta, Kanagawa (JP)

(73) Assignee: Sony Corporation, Tokyo (JP)

(*) Notice: Subject to any disclaimer, the term of this patent is extended or adjusted under 35 U.S.C. 154(b) by 568 days.

(21) Appl. No.: 17/269,954

(22) PCT Filed: Jul. 22, 2019

(86) PCT No.: PCT/JP2019/028658
§ 371 (c)(1),
(2) Date: Feb. 19, 2021

(87) PCT Pub. No.: WO2020/044860
PCT Pub. Date: Mar. 5, 2020

(65) Prior Publication Data
US 2021/0318244 A1    Oct. 14, 2021

(30) Foreign Application Priority Data

Aug. 28, 2018   (JP) ................. 2018-159011

(51) Int. Cl.
*G01J 3/28*   (2006.01)
*G01J 3/02*   (2006.01)
(Continued)

(52) U.S. Cl.
CPC ........ *G01N 21/6456* (2013.01); *G01J 3/0264* (2013.01); *G01J 3/2803* (2013.01);
(Continued)

(58) Field of Classification Search
CPC ...... G01J 3/0264; G01J 3/2803; G01J 3/2823; G01J 3/4406; G01N 21/6456;
(Continued)

(56) References Cited

U.S. PATENT DOCUMENTS

| 2004/0105017 A1 | 6/2004 | Aotsuka |
| 2010/0056928 A1 | 3/2010 | Zuzak |

(Continued)

FOREIGN PATENT DOCUMENTS

| CN | 101577287 A | 11/2009 |
| CN | 103454204 A | 12/2013 |

(Continued)

OTHER PUBLICATIONS

International Search Report and English translation thereof dated Oct. 8, 2019 in connection with International Application No. PCT/JP2019/028658.

*Primary Examiner* — Mark R Gaworecki
(74) *Attorney, Agent, or Firm* — Wolf, Greenfield & Sacks, P.C.

(57) ABSTRACT

A spectroscopic imaging apparatus according to an embodiment of the present technology includes a spectroscopic section, an image sensor, and a control unit. The spectroscopic section disperses incident light for each wavelength. The image sensor is configured to be capable of setting an exposure time or a gain in a unit of a pixel, and detects light of each wavelength dispersed in the spectroscopic section. The control unit is configured to be capable of setting the exposure time or the gain of the image sensor in a unit of a predetermined pixel area.

7 Claims, 14 Drawing Sheets

(51) Int. Cl.
  *G01J 3/44* (2006.01)
  *G01N 21/64* (2006.01)
  *H04N 23/73* (2023.01)
  *H04N 23/76* (2023.01)

(52) U.S. Cl.
  CPC ........... *G01J 3/2823* (2013.01); *G01J 3/4406* (2013.01); *H04N 23/73* (2023.01); *H04N 23/76* (2023.01); *G01N 2021/6417* (2013.01); *G01N 2021/6423* (2013.01)

(58) Field of Classification Search
  CPC ... G01N 2021/6417; G01N 2021/6423; H04N 23/73; H04N 23/76
  See application file for complete search history.

(56) References Cited

U.S. PATENT DOCUMENTS

| | | |
|---|---|---|
| 2011/0064296 A1 | 3/2011 | Dixon |
| 2015/0003713 A1 | 1/2015 | Duann et al. |
| 2016/0057330 A1 | 2/2016 | Zhao et al. |
| 2018/0136116 A1* | 5/2018 | Takashima ............... A01G 7/00 |
| 2018/0356207 A1* | 12/2018 | Takei ................... G01B 11/026 |
| 2018/0356208 A1* | 12/2018 | Kuga ................. G02B 21/0064 |
| 2019/0204577 A1 | 7/2019 | Faris et al. |

FOREIGN PATENT DOCUMENTS

| | | | |
|---|---|---|---|
| CN | 104251850 A | 12/2014 | |
| CN | 105388115 A | 3/2016 | |
| EP | 2818100 A1 | 12/2014 | |
| JP | 2009194604 A | 8/2009 | |
| JP | 2011100058 A | 5/2011 | |
| JP | 2012003198 A | 1/2012 | |
| JP | 2013246140 A | 12/2013 | |
| JP | 2015-008727 A | 1/2015 | |
| JP | 2016-044995 A | 4/2016 | |
| JP | 2016192707 A | 11/2016 | |
| WO | WO 2009/137935 A1 | 11/2009 | |
| WO | WO-2010019515 A2 * | 2/2010 | ........... A61B 5/0059 |
| WO | WO-2010126118 A1 * | 11/2010 | ................ G01J 3/02 |
| WO | WO 2017/223206 A1 | 12/2017 | |

* cited by examiner (a) Before setting (b) After setting

SPECTROSCOPIC IMAGING APPARATUS AND FLUORESCENCE OBSERVATION APPARATUS

CROSS REFERENCE TO RELATED APPLICATIONS

This is a U.S. National Stage Application under 35 U.S.C. §371, based on International Application No. PCT/JP2019/028658, filed Jul. 22, 2019, which claims priority to Japanese Patent Application JP 2018-159011, filed Aug. 28, 2018, each of which is hereby incorporated by reference in its entirety.

TECHNICAL FIELD

The present technology relates to, for example, a spectroscopic imaging apparatus and a fluorescence observation apparatus used for diagnosis of a pathological image.

BACKGROUND ART

A pathological image diagnosis using fluorescence staining has been proposed as a highly quantitative and polychromatic approach (see Patent Literature 1, for example). As compared with colored staining, a fluorescent approach has advantages in that multiplexing is easily performed and detailed diagnostic information is obtained. In a fluorescence imaging other than the pathological diagnosis, an increase in the number of colors makes it possible to examine various antigens expressed in a sample at a time.

CITATION LIST

Patent Literature

Patent Literature 1: Japanese Patent No. 4,452,850

DISCLOSURE OF INVENTION

Technical Problem

A spectroscopic observation apparatus which expands a horizontal axis of an area sensor to space and a vertical axis thereof to wavelength can easily obtain a spectroscopic spectrum of one line on the sample. However, in a case where a bright wavelength band, a very dark wavelength band, or the like is mixed in the spectrum, a dynamic range of the sensor itself is insufficient, a dark portion collapses, or a bright portion saturates, which results that sufficient data is not obtained. On the other hand, in order to solve this problem, if a sensor having a large recording capacity is used, a storage capacity increases in a target such as the pathological image in which the number of whole pixels becomes enormous, and new problems arise such as a decrease in accessibility to data and a slow operation of an entire system.

In view of the above circumstances, an object of the present technology is to provide a spectroscopic imaging apparatus and a fluorescence observation apparatus capable of recording in a high dynamic range while suppressing a recording capacity of a sensor.

Solution to Problem

A spectroscopic imaging apparatus according to an embodiment of the present technology includes a spectroscopic section, an image sensor, and a control unit.

The spectroscopic section disperses incident light for each wavelength.

The image sensor is configured to be capable of setting an exposure time or a gain in a unit of a pixel, and detects light of each wavelength dispersed in the spectroscopic section.

The control unit is configured to be capable of setting the exposure time or the gain of the image sensor in a unit of a predetermined pixel area.

According to the above-described spectroscopic imaging apparatus, it is possible to obtain optimum exposure conditions and to expand a dynamic range of a spectrum to be recorded.

The spectroscopic section may be configured to disperse the incident light in one axial direction for each wavelength, and the control unit may be configured to set the exposure time of the image sensor in a unit of line perpendicular to the one axial direction.

The image sensor may further include a pixel section and a calculation section that calculates a pixel value from image data output from the pixel section. In this case, the control unit is configured to set the gain used for calculating the pixel value in the unit of the predetermined pixel area.

The control unit may include an evaluation section that obtains an emission spectrum of the incident light on the basis of an output of the image sensor, and a storage section that stores a plurality of reference component spectra and an autofluorescence spectrum. The evaluation section is configured to calculate a component ratio of the emission spectrum such that a linear sum of a plurality of the reference component spectra and the autoluminescence spectrum is obtained.

The evaluation section is configured to calibrate at least one of the emission spectrum or the component spectra on the basis of the exposure time or the gain set for each predetermined pixel area.

The evaluation section may be configured to determine whether or not there is a pixel whose pixel value reaches saturation from a captured spectrum, and exclude the pixel reaching the saturation from calculation of a component ratio of the captured spectrum.

A fluorescence observation apparatus according to an embodiment of the present technology includes a stage, an excitation section, a spectroscopic section, an image sensor, and a control unit.

The stage is configured to be capable of supporting a fluorescence stained pathological specimen.

The excitation section irradiates the pathological specimen on the stage with line illumination.

The spectroscopic section disperses the fluorescence excited by the line illumination for each wavelength.

The image sensor is configured to be capable of setting an exposure time or a gain in a unit of a pixel, and detects light of each wavelength dispersed in the spectroscopic section.

The control unit is configured to set the exposure time or the gain of the image sensor in a unit of a predetermined pixel area.

The fluorescence observation apparatus may further include a display section for displaying the fluorescence spectrum on the basis of an output of the image sensor.

The display section may have an operation area for receiving an input of an exposure time or a gain in the unit of the predetermined pixel area.

The display section may have a display area for displaying a spectrum and a histogram after setting on the basis of the exposure time or the gain set.

Advantageous Effects of Invention

As described above, according to the present technology, it is possible to perform recording in a high dynamic range while suppressing a recording capacity of the sensor.

Note that the effects described here are not necessarily limitative, and any of the effects described in the present disclosure may be provided.

MODE(S) FOR CARRYING OUT THE INVENTION

Embodiments according to the present technology will now be described below with reference to the drawings.

Outline of Apparatus

Figure 1:
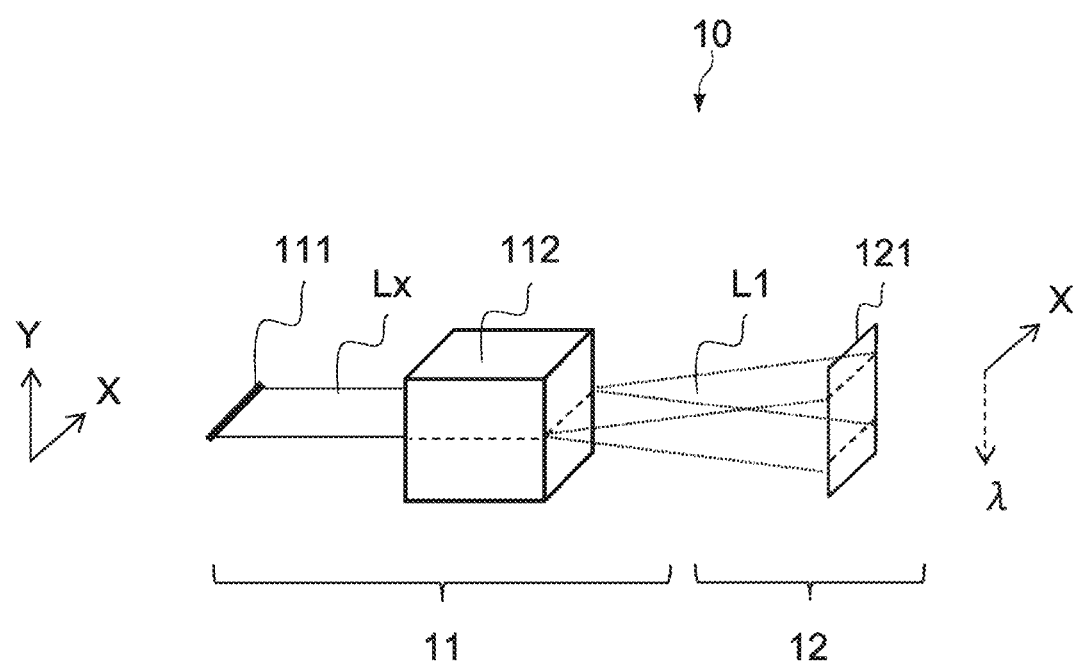
FIG. 1 is a schematic diagram showing a basic configuration of a spectroscopic imaging apparatus according to an embodiment of the present technology.

FIG. 1 is a schematic diagram showing a basic configuration of a spectroscopic imaging apparatus 10 according to an embodiment of the present technology.

As shown in the same figure, the spectroscopic imaging apparatus 10 is a line scan type imaging spectrometer, and includes a spectroscopic section 11 and a detection section 12. The spectroscopic section 11 has a slit 111 parallel with the X-axis direction, and a wavelength dispersive element 112. The detection section 12 includes an image sensor (area sensor) 121 including a solid-state imaging element such as a CMOS (Complementary Metal-Oxide Semiconductor) and a CCD (Charge-Coupled Device).

The slit 111 extracts a spatial component in the X-axis direction of incident light (fluorescence) from a sample (not shown) on the xy plane. The wavelength dispersive element 112 disperses incident light Lx passing through the slit 111 for each wavelength to image the image sensor 121. As the wavelength dispersive element 112, a prism or a diffraction grating is typically used to separate each wavelength band of the incident light Lx in the Y-axis direction. The image sensor 121 obtains a spectral image of $(X, \lambda)$ of the incident light L1 wavelength-separated in the wavelength dispersive element 112. By incorporating a mechanism for scanning the sample in the Y-axis direction, a spectral image of $(X, Y, \lambda)$ can be obtained.

The image sensor 121 is configured to be capable of setting an exposure time or a gain for a unit of a pixel, as will be described later. By adjusting the exposure time or the gain depending on a light receiving area of the light in each wavelength band, it is possible to suppress saturation for the light in a bright wavelength band and to obtain a spectral image with sufficient sensitivity for the light in a dark wavelength band.

Furthermore, the image sensor 121 is configured to read only a part of an area from a read-out area of in a full frame. As a result, a frame rate can be improved by an amount corresponding to a reduction of the read-out area. Furthermore, it is possible to divide any area of the read-out area into plural, and set a different gain and exposure time in each area.

Fluorescence Observation Apparatus

Figure 2:
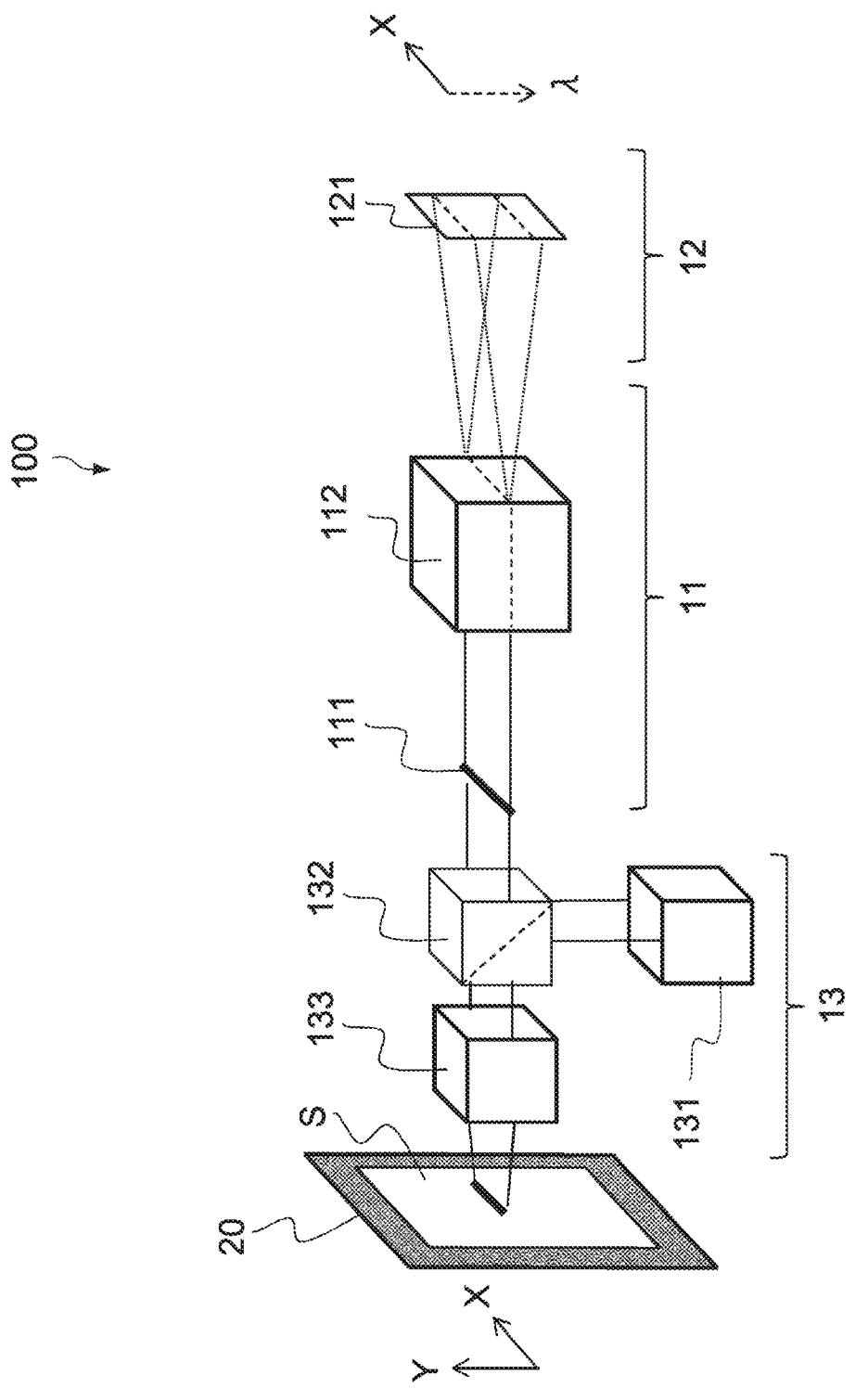
FIG. 2 is a schematic diagram showing an optical system of a fluorescence observation apparatus provided with the spectroscopic imaging apparatus.

FIG. 2 is a schematic diagram showing an optical system of the fluorescence observation apparatus 100 including the spectroscopic imaging apparatus 10 of the present embodiment.

As shown in the same figure, the fluorescence observation apparatus 100 includes a spectroscopic section 11, a detection section 12, and a fluorescence excitation section 13. The fluorescent excitation section 13 includes an excitation light optical system 131, a filter block 132, and an objective lens 133.

The excitation light optic system 131 includes one light source or a plurality of light sources capable of emitting excitation light. As the light source, a light emitting diode (LED), a laser diode (LD), a mercury lamp, or the like is used. The excitation light is line-illuminated and irradiates the sample S on a stage 20 in parallel with the xy plane.

Figure 3:
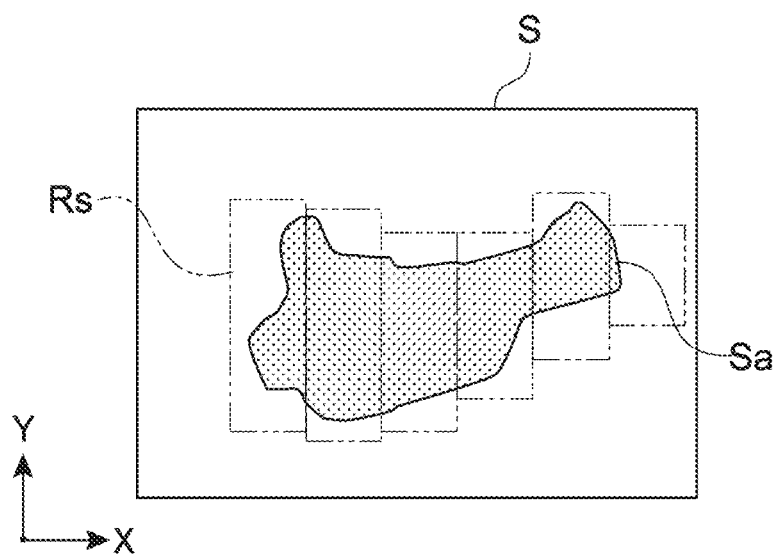
FIG. 3 a schematic diagram of a pathological specimen of an observation target.

The sample S is typically formed of a slide including an observation target Sa such as a tissue section shown in FIG. 3. However, it should be appreciated that the sample S may be formed of something other than such a slide. The sample S (observation target Sa) is stained by a plurality of fluorescent pigments excited by irradiation of the excitation light.

A filter block 132 includes a dichroic mirror, a band-pass filter, and the like. The dichroic mirror reflects the excitation light from the excitation light optical system 131 toward the objective lens 133, and transmits the fluorescence from the sample S transmitted through the objective lens 133 toward the spectroscopic section 11. The bandpass filter has a band-pass characteristic of cutting the wavelength band of the excitation light of the light directing from the sample S toward the spectroscopic section 11.

Figure 4:
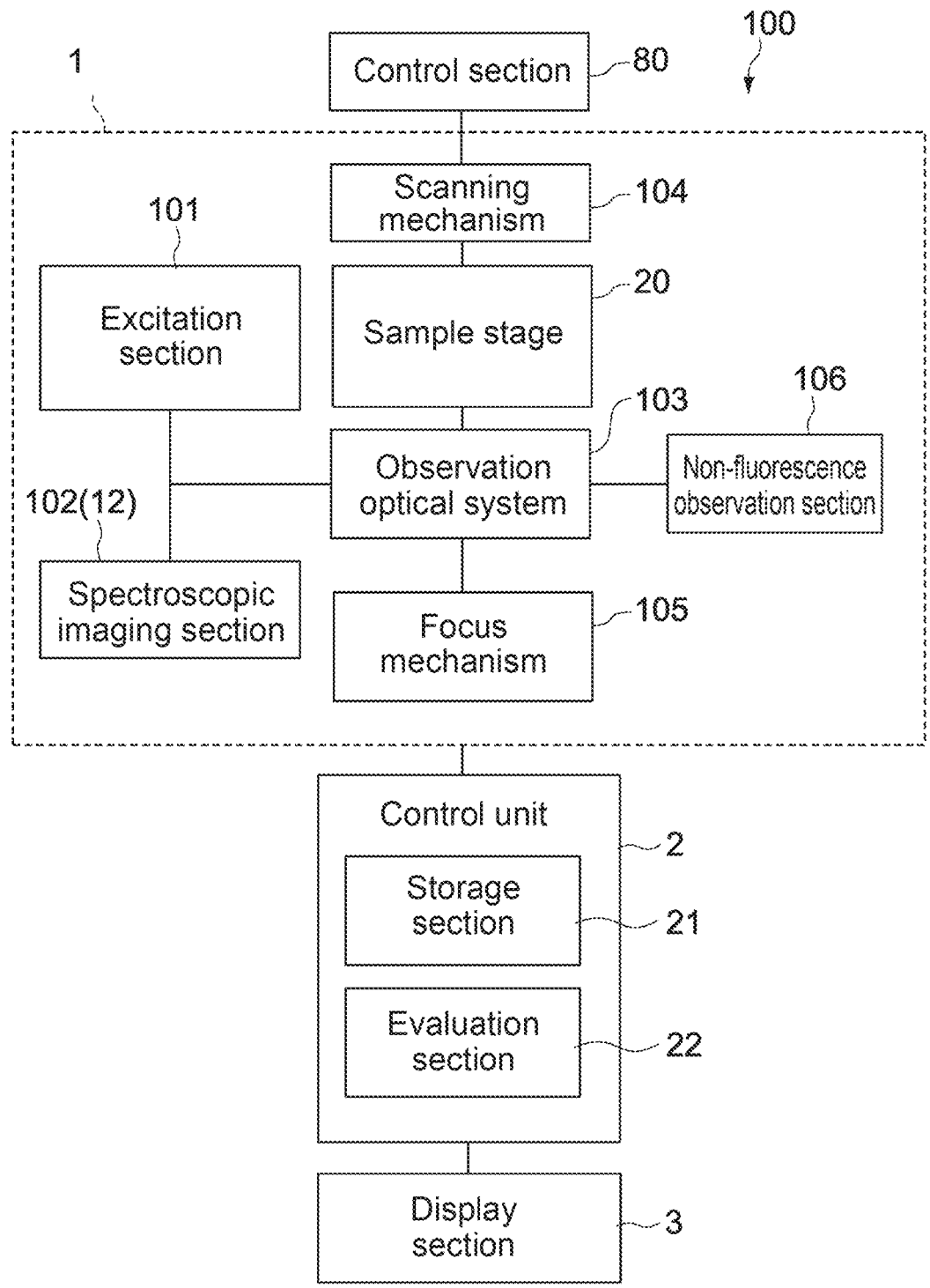
FIG. 4 is a block diagram showing a configuration of the fluorescence observation apparatus.

FIG. 4 is a block diagram showing a configuration of the fluorescence observation apparatus 100. The fluorescence observation apparatus 100 includes an apparatus main body 1, a control unit 2, and a display section 3.

The apparatus main body 1 includes the stage 20, an excitation light source (excitation section) 101, a spectroscopic imaging section 102, an observation optical system 103, a scanning mechanism 104, a focus mechanism 105, a non-fluorescence observation section 106, and the like.

The excitation light source 101 corresponds to the excitation optical system 131, and the spectroscopic imaging section 102 corresponds to the spectroscopic section 11 and the detection section 12. The observation optical system 103 corresponds to the filter block 132 and the objective lens 133.

The scanning mechanism 104 is typically formed of an XY moving mechanism that moves in parallel with the stage 20 in at least two directions of the X and Y axes. In this case, an image-capturing area Rs is divided into a plurality of areas in the X-axis direction, for example, as illustrated in FIG. 3, and an operation is repeatedly performed, i.e., scanning the sample S in the Y-axis direction, subsequently moving the sample S in the X-axis direction, and further performing scanning in the Y-axis direction. As a result, a large-area spectral image can be obtained, and, for example, in the case of a pathological slide or the like, WSI (Whole slide imaging) can be obtained.

The focus mechanism 105 moves the stage 20 or the objective lens 133 to an optimal focal position in a direction perpendicular to the X-axis and the Y-axis. The non-fluorescence observation section 106 is used for dark field observation, bright field observation, or the like of the sample S, but may be omitted as necessary.

The fluorescence observation apparatus 100 may be connected to a control section 80 for controlling a fluorescence excitation section (control of LD or shutter), an XY stage as the scanning mechanism, a spectroscopic imaging section (camera), a focusing mechanism (detection section and Z-stage), a non-fluorescence observation section (camera), and the like.

Image Sensor

Figure 5:
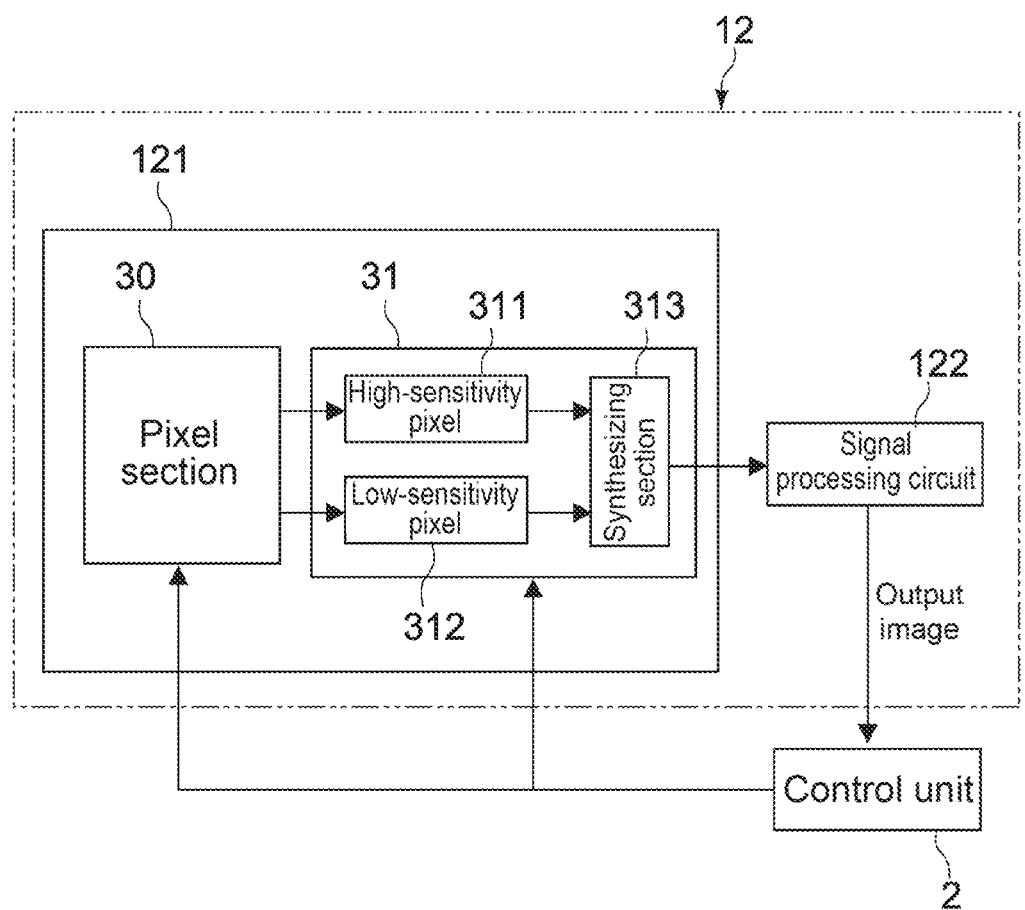
FIG. 5 is a block diagram showing a configuration of a detection section and its periphery in the fluorescence observation apparatus.

FIG. 5 is a block diagram showing a configuration of the detection section 12 and its periphery.

As shown in the same figure, the detection section 12 includes an image sensor 121, and a signal processing circuit 122. The image sensor 121 includes a pixel section 30 and a calculation section 31.

The pixel section 30 outputs charge information corresponding to the exposure time by photoelectric conversion in each pixel of a pixel array of the Bayer array consisting of RGB pixels, for example. The pixel section 30 is set to a different exposure time in a unit of a pixel area (e.g., row (line) unit) by a control of the control unit 2 (shutter control). From the row to be subjected to long-time exposure, high-sensitivity pixel information 311 corresponding to accumulated charge based on the long-time exposure is output. From the row to be subjected to short-time exposure, low-sensitivity pixel information 312 corresponding to the accumulated charge based on the short-time exposure is output.

The calculation section 31 calculates a pixel value from image data output from the pixel section 30. In the present embodiment, the calculation section 31 inputs the high-sensitivity pixel information 311 and the low-sensitivity pixel information 312 output from the pixel section 30, and has an image information synthesizing section 313 for generating one piece of image information on the basis of the input information. The output of the image information synthesizing section 313 is input to the signal processing circuit 122. The signal processing circuit 122 performs signal processing, for example, such as white balance (WB) adjustment and y correction to generate an output image. The output image is supplied to the control unit 2, stored in a storage section 21 described later, or output to the display section 3.

The image sensor 121 obtains fluorescence spectroscopic data $(x, \lambda)$ utilizing the pixel array in the Y-axis direction (vertical direction) of the pixel section 30 as a channel of the wavelength. The obtained spectroscopic data $(x, \lambda)$ is recorded in the control unit 2 (storage section 21) in a state in which whether the spectroscopic data excited from which excitation wavelength is tied.

An exposure time of the pixel section 30 is set for each predetermined pixel area by the control unit 2. In the present embodiment, since the wavelength dispersive element 112 in the spectroscopic section 11 wavelength-separates the incident light Lx (see FIG. 1) in the Y-axis direction, light having a different wavelength in the Y-axis direction (emission spectrum) reaches the pixel section 30 of the image sensor 121. Therefore, in the present embodiment, as described above, by the control of the control unit 2 (shutter control), the exposure time of the pixel section 30 is set in a unit of a line in parallel with the X-axis direction perpendicular to the Y-axis direction.

The control unit 2 is further configured to be capable of individually setting the gain for sensitivity compensation multiplied by each of the high-sensitivity pixel information 311 and the low-sensitivity pixel information 312 in the image information synthesizing section 313 of the calculation section 31 in the unit of the pixel area. Thus, it becomes possible to increase the sensitivity of the low-sensitivity pixel information while suppressing the saturation of the high-sensitivity pixel information 311.

Set values of the exposure time and the gain are not particularly limited, and may be arbitrary values or values based on an emission spectrum intensity of the pigment measured in advance. For example, when the exposure time of a low-sensitivity pixel area and the gain of the pixel value are set to 1, the exposure time of a high-sensitivity pixel information area and the gain of the pixel value are set to, for example, a range of about 1.5 to 5.0.

In addition, it is not limited to the case where both the exposure time and the gain are set, and it may be set so that only the exposure time is adjustable, or it may be set so that only the gain is adjustable. Alternatively, one of the exposure time and the gain as a main set value, and the other may be a supplemental set value. For example, by setting the exposure time as the main set value, the image data with good S/N can be obtained.

Figure 6:
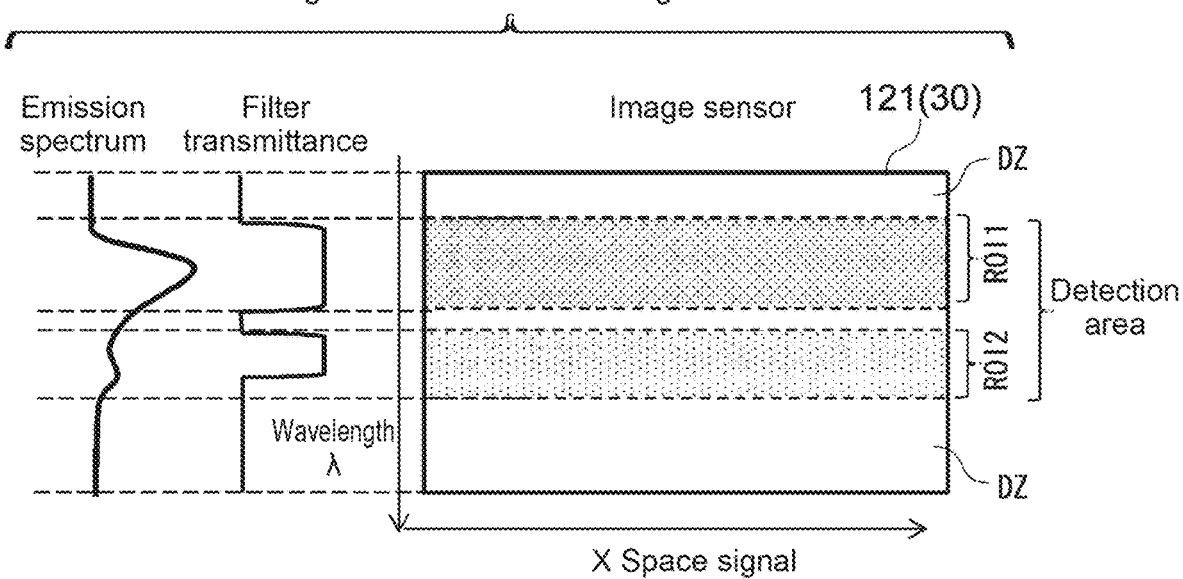
FIG. 6 is a schematic diagram for explaining a relationship between a pixel section and an emission spectrum.

FIG. 6 is a schematic diagram for explaining a relationship between the pixel section 30 and the emission spectrum.

As shown in the same figure, the control unit 2 determines a detection area from a wavelength range of the emission spectrum, from a transmission wavelength range of the filter block 132 (see FIG. 2), and from an entire read-out area of the image sensor 121 (pixel section 30). In the case of fluorescence imaging, the filter block 132 generally has a bandpass characteristic for cutting off excitation light. Therefore, if a plurality of the excitation wavelengths exists, a band (opaque band DZ) in which the wavelengths are not transmitted as shown in the same figure is generated. The control unit 2 excludes an area that does not include such a signal to be detected from the detection area.

Figure 7:
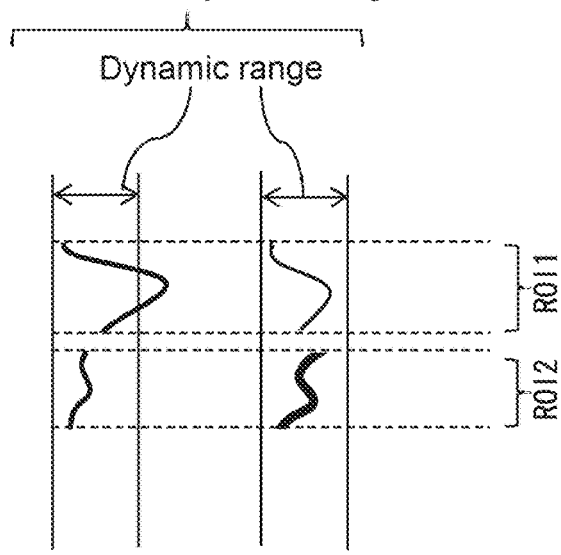
FIG. 7 is an explanatory diagram showing a relationship between the emission spectrum and a dynamic range in a detection area.

As shown in FIG. 6, when areas located above and below an impermeable zone DZ are taken as ROI1 and ROI2, respectively, the emission spectra of the pigments having the corresponding peaks (hereinafter, also referred to as fluorescent spectrum) is detected. FIG. 7 is an explanatory diagram showing the relationship between the emission spectrum and the dynamic range in the detection area, (a) of the same figure shows obtained data before setting the exposure time and the gain (exposure time or gain is same in each detection area), and (b) of the same figure shows obtained data after setting the exposure time and the gain, respectively.

As shown in FIG. 7(*a*), the pigment of ROI1 has a strong spectral intensity and saturates beyond the dynamic range of detection, whereas the pigment of ROI2 has a weak intensity. In the present embodiment, as shown in FIG. 7(*b*), the exposure time of (X, λ) area corresponding to the ROI1 is set to be relatively short (or gain is set to be relatively small), and conversely, the exposure time of (X, λ) area corresponding to the ROI2 is set to be relatively long (or gain is set to be relatively large). As a result, both dark and light pigments can be captured with suitable exposure. Coordinate information of the detected area, such as the ROI1 and the ROI2, and the gain, and information about the exposure duration are stored in the storage section 21 of the control unit 2.

Control Unit

The fluorescence spectrum obtained by the detection section 12 including the image sensor 121 (spectroscopic imaging section 102) is output to the control unit 2. Captured data of a multiple fluorescence spectrum can be quantitatively evaluated by component analysis (color separation) on the basis of the spectrum of the pigment alone or the like. The control unit 2, as shown in FIG. 4, includes the storage section 21 and the evaluation section 22.

The control unit 2 may be implemented by hardware elements used in a computer, such as a CPU (Central Processing Unit), a RAM (Random Access Memory), and a ROM (Read Only Memory), and by necessary software. Instead of or in addition to the CPU, a PLD (Programmable Logic Device) such as an FPGA (Field Programmable Gate Array), or a DSP (Digital Signal Processor), other ASIC (Application Specific Integrated Circuit (ASIC), or the like may be used.

The storage section 21 stores in advance a component spectrum serving as a plurality of references of the pigment alone for staining the sample S and an autoluminescence spectrum of the sample S (hereinafter, also collectively referred to as standard spectra). An evaluation section 22 separates the emission spectrum of the sample S obtained by the image sensor 121 into a spectrum derived from the pigment and the autoluminescence spectrum on the basis of the standard spectra stored in the storage section 21, and calculates each component ratio. In the present embodiment, the component ratio of the emission spectrum of the captured sample S is calculated so as to be a linear sum of standard spectra.

On the other hand, the emission spectrum of the sample S obtained by the image sensor 121 is modulated from the original spectrum because the exposure time and the gain are individually set for each detection area. Therefore, if the data obtained by the image sensor 121 is used as it is, a color separation calculation of the component spectrum may not be performed accurately.

Accordingly, the evaluation section 22 is configured to calibrate at least one of the emission spectrum or the reference component spectrum on the basis of the exposure time and the gain set for each predetermined pixel area (detection area) of the image sensor 121.

Figure 8:
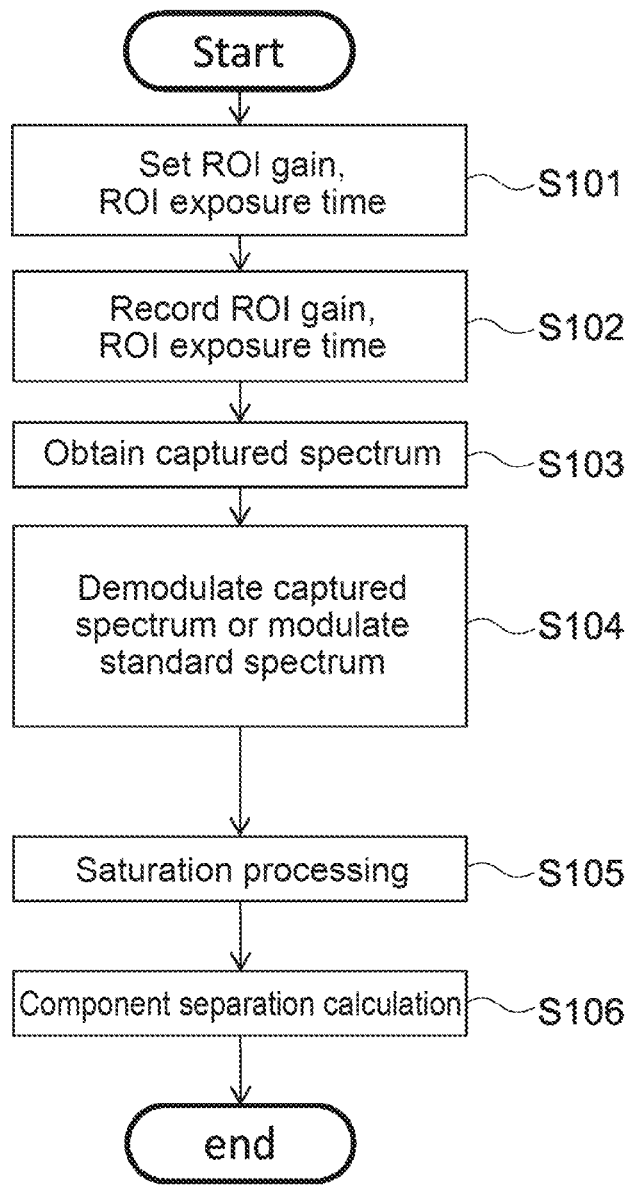
FIG. 8 is a flowchart showing a processing procedure up to component separation calculation of the emission spectrum executed in a control unit.

FIG. 8 is a flowchart showing a processing procedure up to the component separation calculation of the emission spectrum executed in the control unit 2. Hereinafter, the emission spectrum of the sample S obtained by the image sensor 121 is also referred to as the captured spectrum.

As shown in the same figure, the control unit 2 sets the exposure time and the gain of the detection area of the pixel section 30 of the image sensor 121 (Step 101). These set values are input by the user via the display section 3 to be described later. After the exposure time and the gain set are recorded to the storage section 21, the control unit 2 obtains the captured spectrum of the sample S via the image sensor 121 (Steps 102 and 103).

The control unit 2 demodulates the captured spectrum on the basis of the set gain and the set exposure time of each detection area, or calibrates the captured spectrum by modulating the standard spectra stored in the storage section 21 (Step 104). In other words, on the basis of the set exposure time and the set gain, the captured spectrum and the standard spectra are converted into a common intensity axis. The intensity axis include, for example, a charge number per unit time [e⁻], spectrum radiance [W/(sr·m²·nm)], or the like. In a case where the standard spectra are changed, the standard spectra are multiplied by a relative intensity ratio of each detection area at the time of capturing. Thereafter, saturation processing (Step 105), which will be described later, is performed as necessary, and then component separation calculation of the captured spectrum is performed (Step 106).

On the other hand, in a case where a spectrum capturing of a multiple fluorescent sample is performed by spectroscopy, it is important to set a parameter such as the exposure time and the gain of each pixel so that capturing can be done without saturation in advance. However, in an WSI or the like, it is very difficult to obtain an optimal exposure in all areas of the sample, and a time loss is large as well. When saturation occurs during capturing, a peak of the spectrum reaches the limit at an AD (Analog to Digital) max value of the sensor, making it impossible to capture a correct spectrum. Therefore, there arises a problem that a deviation from the component spectrum (standard spectra) prepared in advance for the color separation calculation becomes large, and a correct calculation cannot be performed.

Therefore, in the present embodiment, the saturation processing described later is performed in addition to an expansion of the dynamic range by a ROI (Region of interest) setting. This makes it possible to correctly perform the color separation calculation even when there is some saturation in the captured spectrum, thereby reducing the number of retries of capturing.

The saturation processing in the present embodiment executes processing of specifying the pixel in which the saturation occurs and excluding the pixel from the calculation. An example of the processing procedure is shown in FIG. 9.

Figure 9:
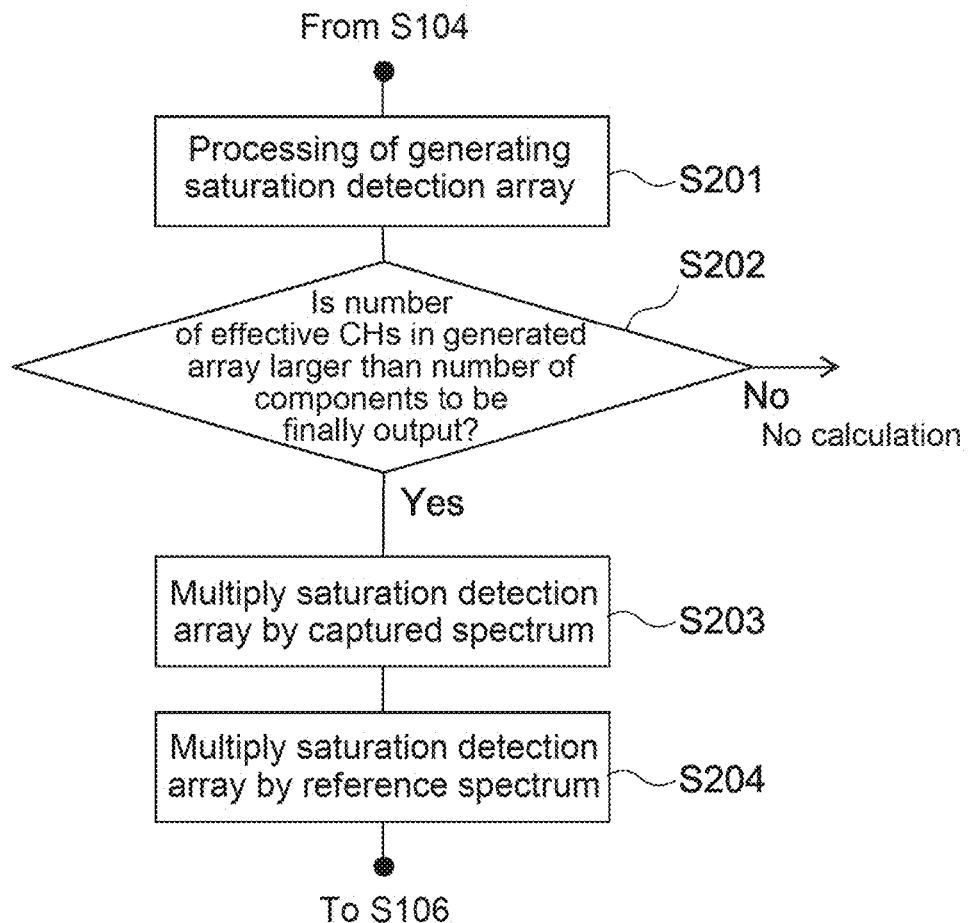
FIG. 9 is a flowchart showing an example of a saturation processing procedure in the embodiment.

FIG. 9 is a flow chart showing the saturation processing procedure.

Figure 10:
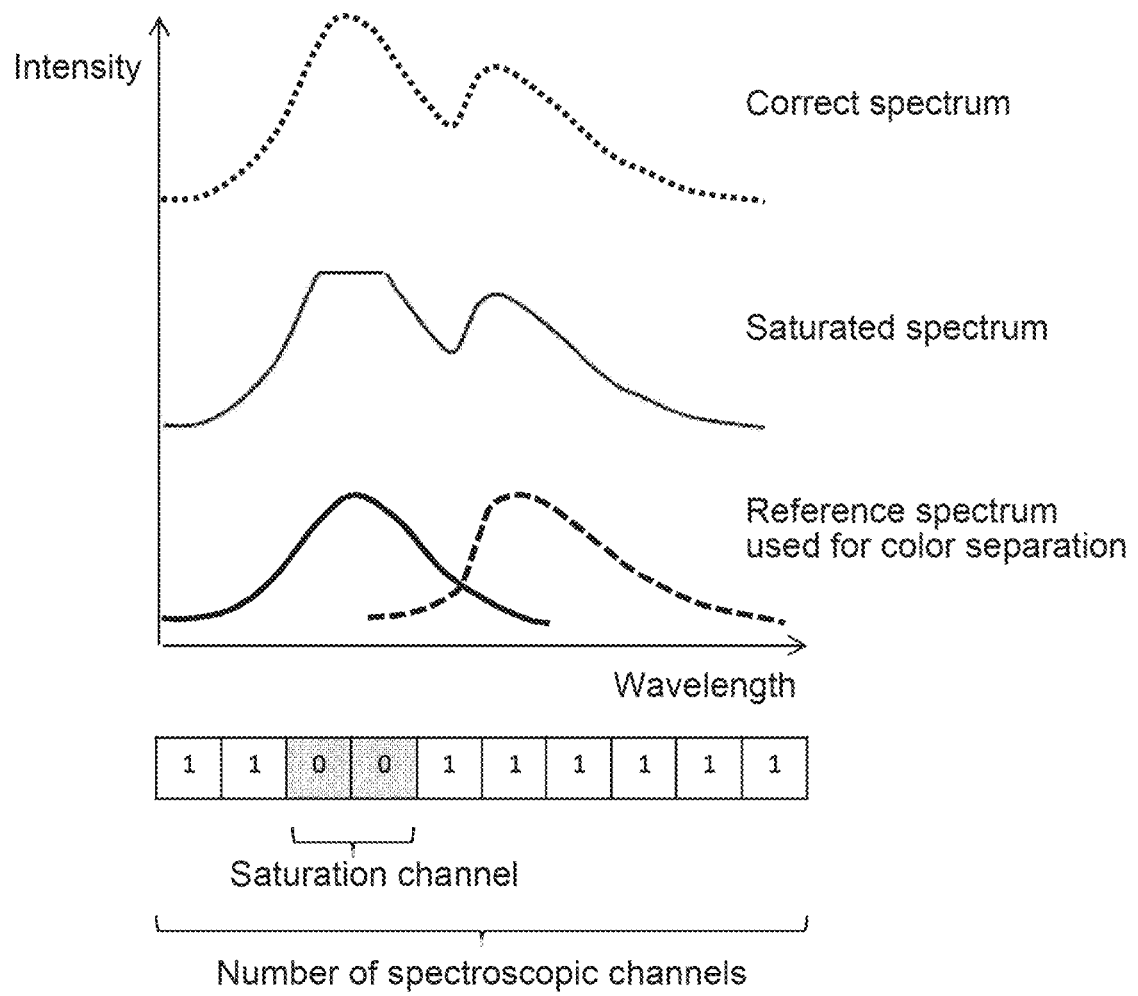
FIG. 10 is a schematic diagram explaining an example of the saturation processing.

As shown in the same figure, the control unit 2 executes processing of generating a saturation detection array from the obtained captured spectrum (Step 201). As shown in FIG. 10, the presence or absence of saturation of the captured spectrum is determined for each wavelength (channel), and the saturation detection array is generated in which a channel without saturation is set to "1" and a channel with saturation is set to "0".

The presence or absence of saturation is determined by referring to the pixel value of each detection area and whether or not it reaches a maximum luminance value. Since the pixel area reaching the maximum luminance value is estimated to be saturated in comparison with the original correct spectrum, the channel of the reference spectrum corresponding to the pixel area (channel) is removed from the component separation calculation.

In general, the number of channels (CH number) of the wavelength recorded by the spectrum capturing is often larger than the number of components to be finally output. Therefore, if the number of effective channels in which no saturation occurs is larger than the number of components, even if the data of the channel in which saturation occurs is removed from the calculation, the component separation calculation can be performed.

When the number of effective channels (number of channels determined as "1") in the generated array is larger than the number of components (number of channels) to be finally output, processing of multiplying the saturation detection array by the captured spectrum and the reference spectrum is executed (Steps 203 and 204). Otherwise, the calculation is impossible, and therefore, the processing is ended without executing the component separation calculation. As a result, since the channel in which the saturation occurs is excluded from a calculation of a least squares method, it is possible to perform a component ratio calculation only with the correctly measured wavelength.

According to the present embodiment as described above, with respect to the image sensor 121 capable of changing a gain setting and the exposure time of any detection area, a spectroscopic imaging optical system is provided to expand the horizontal axis of the image sensor 121 to space and the vertical axis thereof to wavelength. From each area of the image sensor 121, by setting so as to read only the detection area, further dividing the detection area into two or more two-dimensional spaces ROI of wavelength×space, and by setting a combination of different gains and exposure times to each detection area, the optimum exposure condition is obtained and it is also possible to expand the dynamic range of the spectrum to be recorded.

For example, when a multiple fluorescent stained sample is taken, a blue fluorescent pigment may have a very high intensity compared to a red fluorescent pigment. Under such conditions, the exposure time of the blue wavelength band is shortened, the gain is set to be lower, the exposure time of the red wavelength band is lengthened, and the gain is set to be higher. As a result, recording with a shallow bit range can be performed, so that recording with a high dynamic range can be performed while suppressing the recording capacity of the sensor.

The detection area of the image sensor 121 is set from the spectrum of the object to be measured within the sensitivity area of the sensor. If there are a non-transparent band such as a notch filter, and an area where light is not present in an observation light path, a recording frame rate can be improved by excluding them from the read-out area.

Furthermore, according to the present embodiment, when a color mixing ratio of each pigment is separately calculated from the obtained spectrum, even if there is some saturation in the captured spectrum, color separation by spectrum fitting can be performed by generating a saturation detection array (see FIG. 10) for distinguishing a saturated wavelength from the other wavelengths.

Display Section

A problem of a capturing parameter setting by the ROI is that a capturing condition is difficult to be understood for a user. Because the data is three-dimensional of a space and a wavelength, it is hard to see where the saturation occurs and a signal of which wavelength is insufficient. A section that performs ROI setting and displaying needs to be capable of comprehensively displaying and setting a relationship between a setting parameter and a capture range, a relationship between the setting parameter and a sensor output, and the like.

Therefore, in the present embodiment, the display section 3 is configured as follows and details of the display section 3 will be described below. Here, as an example, a configuration of the display section 3 assuming a multiple fluorescence imaging will be described.

Figure 11:
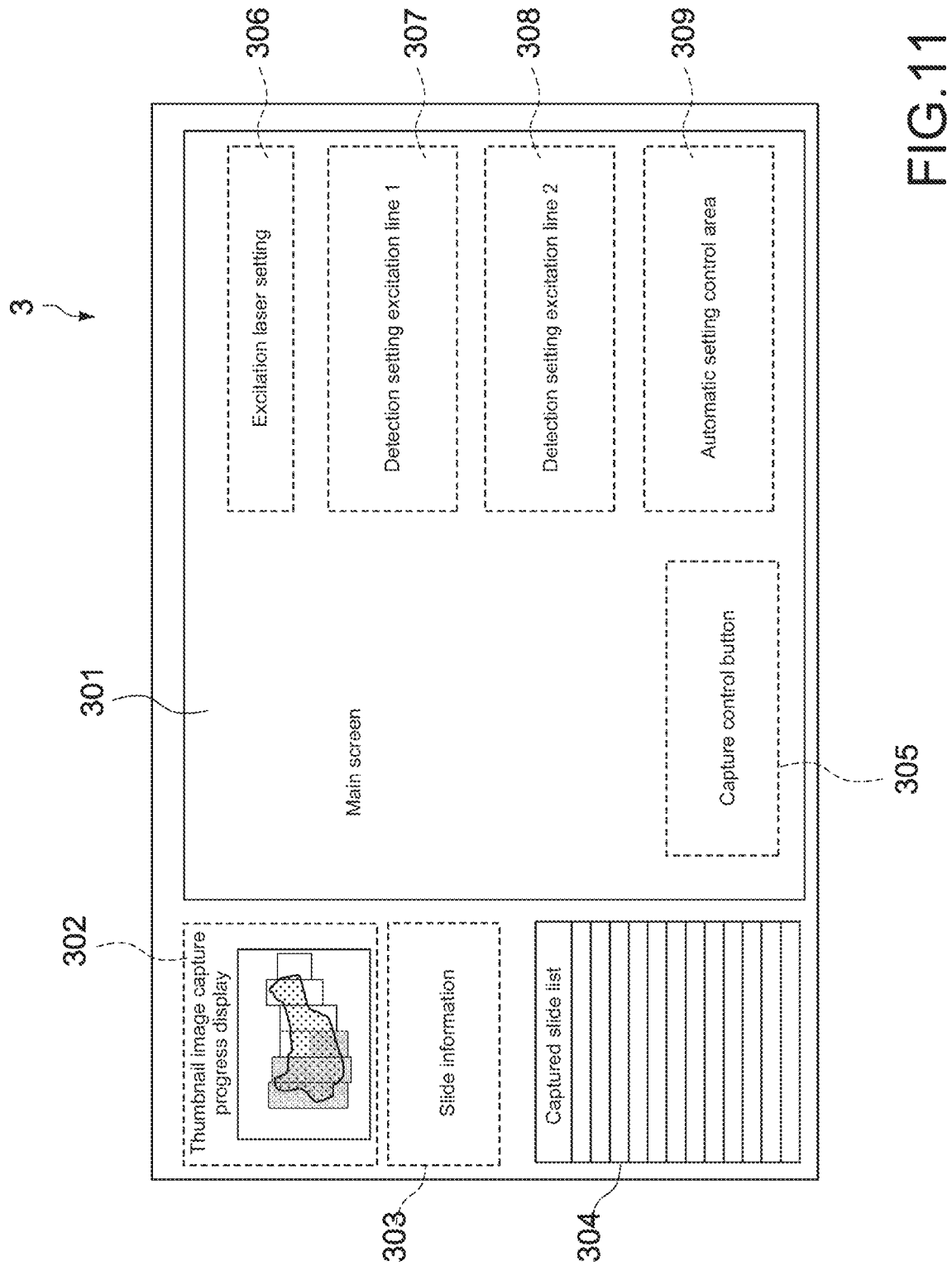
FIG. 11 is a schematic diagram of a display section in the fluorescence observation apparatus.

FIG. 11 is a schematic diagram explaining the display section 3. The display section 3 is configured to be capable of displaying the fluorescence spectrum of the sample S on the basis of the output of the image sensor 121. The display section 3 may be constituted by a monitor mounted integrally to the control unit 2 or may be a display apparatus connected to the control unit 2. The display section 3 includes a display element such as a liquid crystal device or an organic EL device, and a touch sensor, and is configured as a UI (User Interface) that displays a setting for inputting a capturing condition, a captured image, and the like.

As shown in FIG. 11, the display section 3 includes a main screen 301, a thumbnail image display screen 302, a slide information display screen 303, and a captured slide list display screen 304. The main screen 301 includes a display area 305 of a control button (key) for capturing, a setting area 306 of an excitation laser (line illumination), detection setting areas 307 and 308 of the spectrum, a spectrum automatic setting control area 309, and the like. There may be at least one of these areas 305 to 309, and other display area may be included in one display area.

The fluorescence observation apparatus 100 sequentially performs a takeout of a slide (sample S) from a slide rack (not shown), reading of slide information, capturing of a thumbnail of the slide, setting of an exposure time, and the like. The slide information includes patient information, a tissue site, a disease, staining information, and the like, and is read from a bar code, a QR code (registered trademark), or the like attached to the slide. The thumbnail image and the slide information of the sample S are respectively displayed on the display screens 302 and 303. The captured slide information is displayed on the screen 304 as a list.

In addition to the fluorescence image of the sample S, a capturing state of the slide currently captured is displayed on the main screen 301. The excitation laser is displayed or set in the setting area 306, and the fluorescence spectrum derived from the excitation laser is displayed or set in the detection setting areas 307 and 308.

Figure 12:
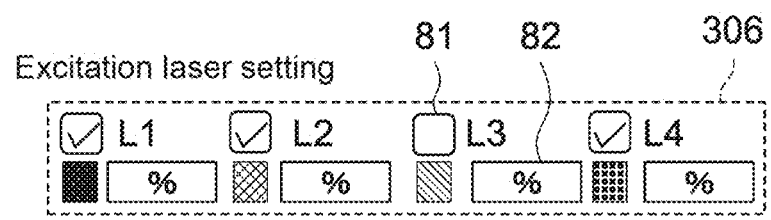
FIG. 12 is a diagram showing an example of a screen configuration of a setting area of an excitation section in the display section.

FIG. 12 is a diagram showing an example of a screen configuration of the setting area 306 of the excitation laser. Here, ON/OFF of outputs of respective excitation lines L1-L4 are selected or switched by a touch operation to each checkbox 81. Furthermore, a magnitude of the output of each light source is set through an operation section 82.

Figure 13:
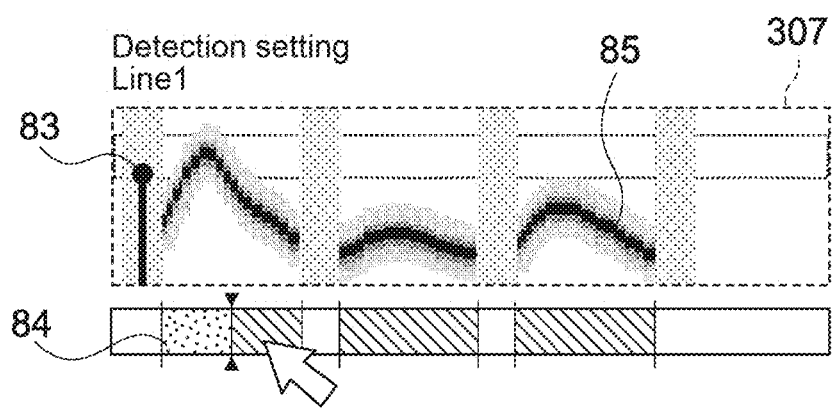
FIG. 13 is a diagram showing an example of a screen configuration of a detection setting area of a fluorescence spectrum from one line illumination in the display section.
Figure 14:
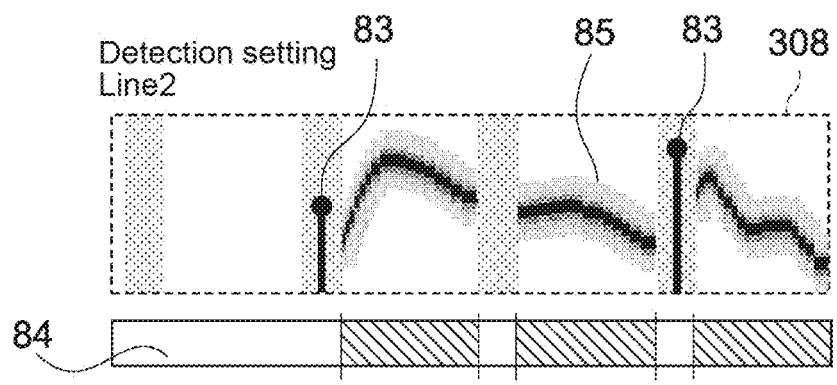
FIG. 14 is a diagram showing an example of a screen configuration of a detection setting area of a fluorescence spectrum from other line illumination in the display section.

FIG. 13 shows an example of a screen configuration of a spectrum detection setting area 307 in an excitation line 1, and FIG. 14 shows an example of a screen configuration of the spectrum detection setting area 308 in an excitation line 2. In each figure, the vertical axis represents brightness, and the horizontal axis represents a wavelength. These detection setting areas 307 and 308 are each configured as an operation area for accepting the exposure time and the input of the gain in a predetermined unit of the pixel of the image sensor 121.

In FIGS. 13 and 14, an index 83 indicates that the excitation light sources (L1, L2, and L4) are on, and that a longer length of the indicator 83 indicates a greater power of the light source. A detection wavelength range of the fluorescence spectrum 85 is set by an operation bar 84. A display method of the fluorescence spectrum 85 is not particularly limited, for example, is displayed in a total pixel average spectrum (wavelength x intensity) at the excitation lines 1 and 2.

As shown in FIG. 13 and FIG. 14, the fluorescence spectrum 85 may be displayed by a heat map method in which frequency information of values is expressed in shading. In this case, it is also possible to visualize a signal distribution that is not clear by an average value.

Note that the vertical axis of the graph used to display the fluorescence spectrum 85 is not limited to a linear axis, and may be a logarithmic axis or a hybrid axis (biexponential axis).

It is possible to set the fluorescence spectrum 85 depending on the wavelength and the power of the excitation light source. The wavelength range of the fluorescence spectrum 85 can be arbitrarily changed by a cursor movement operation on the operation bar 84 using an input device such as a mouse. The fluorescence spectrum 85 is represented by a current average or a waveform calculated from the last captured waveform in consideration of a setting change.

The control unit 2 sets a read area of the image sensor 121 on the basis of the wavelength band input to the detection setting areas 307 and 308 (set value). On the basis of the wavelength band set by the detection setting areas 307 and 308 and a predetermined conversion formula (conversion formula to a pixel corresponding to wavelength) obtained in advance, a sensor coordinate is specified and the exposure time and the gain are set. A display area capable of individually setting the exposure time and the gain may be provided separately. The detection setting areas 307 and 308 display the fluorescence spectrum 85 after setting on the basis of the exposure time and the gain input and set via the operation bar 84.

Figure 15:
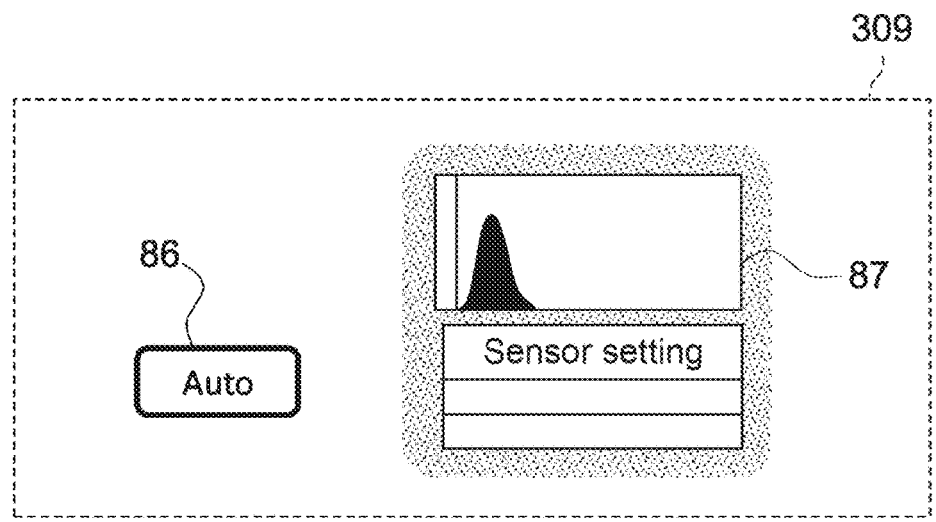
FIG. 15 is a diagram for explaining a histogram window in the display section.

FIG. 15 shows an example of a screen configuration of the spectrum automatic setting control area 309. In the spectrum automatic setting control area 309, an automatic setting key 86, a histogram window 87, and the like are arranged. The automatic setting start key 86 automatically performs pre-sampling imaging and the above-described spectrum detection setting. The histogram window 87 calculates and displays a histogram corresponding to the wavelength range of the spectrum set in the detection setting areas 307 and 308. The vertical axis of the histogram is frequency and the horizontal axis is the wavelength.

Referring to the histogram window 87, it is possible to explicitly confirm an occurrence of saturation and the presence or absence of a signal shortage (insufficient strength) when captured under the detection conditions of the spectrum set in the detection setting areas 307 and 308. In addition, it is possible to change the exposure time and the gain while checking the histogram.

Figure 16:
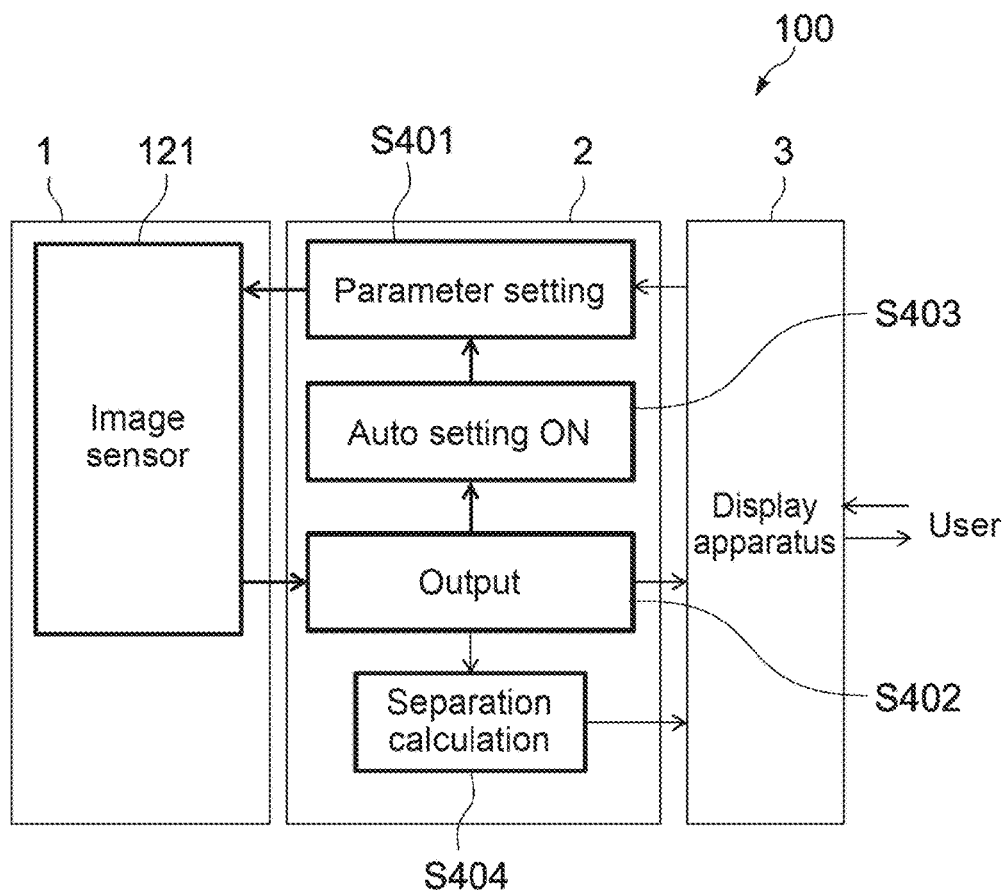
FIG. 16 is a block diagram of the fluorescence observation apparatus for explaining processing performed in the control unit.

FIG. 16 is a block diagram of the fluorescence observation apparatus 100 for explaining the processing executed in the control unit 2.

The control unit 2 stores the parameters set in the various setting areas 306 to 308 of the display section 3 in the storage section 21 (see FIG. 4), and sets the read area (wavelength band), the exposure time, and the gain based on the parameter to the image sensor 121 (S401).

The control unit 2 outputs the emission spectrum of the sample S obtained by the image sensor 121 to the display section 3 (S402), and the waveform of the spectrum is displayed in the detection setting areas 307 and 308 (see FIGS. 13 and 14).

In the automatic setting control mode, the control unit 2 executes optimization processing of the exposure time and the gain on the basis of the captured data of the image sensor 121 (step 403), and repeats processing of acquiring the captured data for the parameter after change.

On the other hand, when the component separation calculation of the captured spectrum is performed, the above-described component separation calculation is performed on the basis of the captured data of the image sensor 121, and the result is displayed on the display section 3 (for example, main screen 301) (S404).

As described above, according to the present embodiment, on the basis of the set wavelength band, the exposure time, and the gain, the spectrum and the histogram after setting are captured and displayed in real time, and the spectrum and the histogram at a new set value are displayed from the obtained spectrum. Thus, the relationship between the setting parameter and the capture range, the relationship between the setting parameter and the sensor output, etc. can be comprehensively displayed and set.

Modifications

Next, a modification of the configuration of the fluorescence observation apparatus 100 described above will be described.

Figure 17:
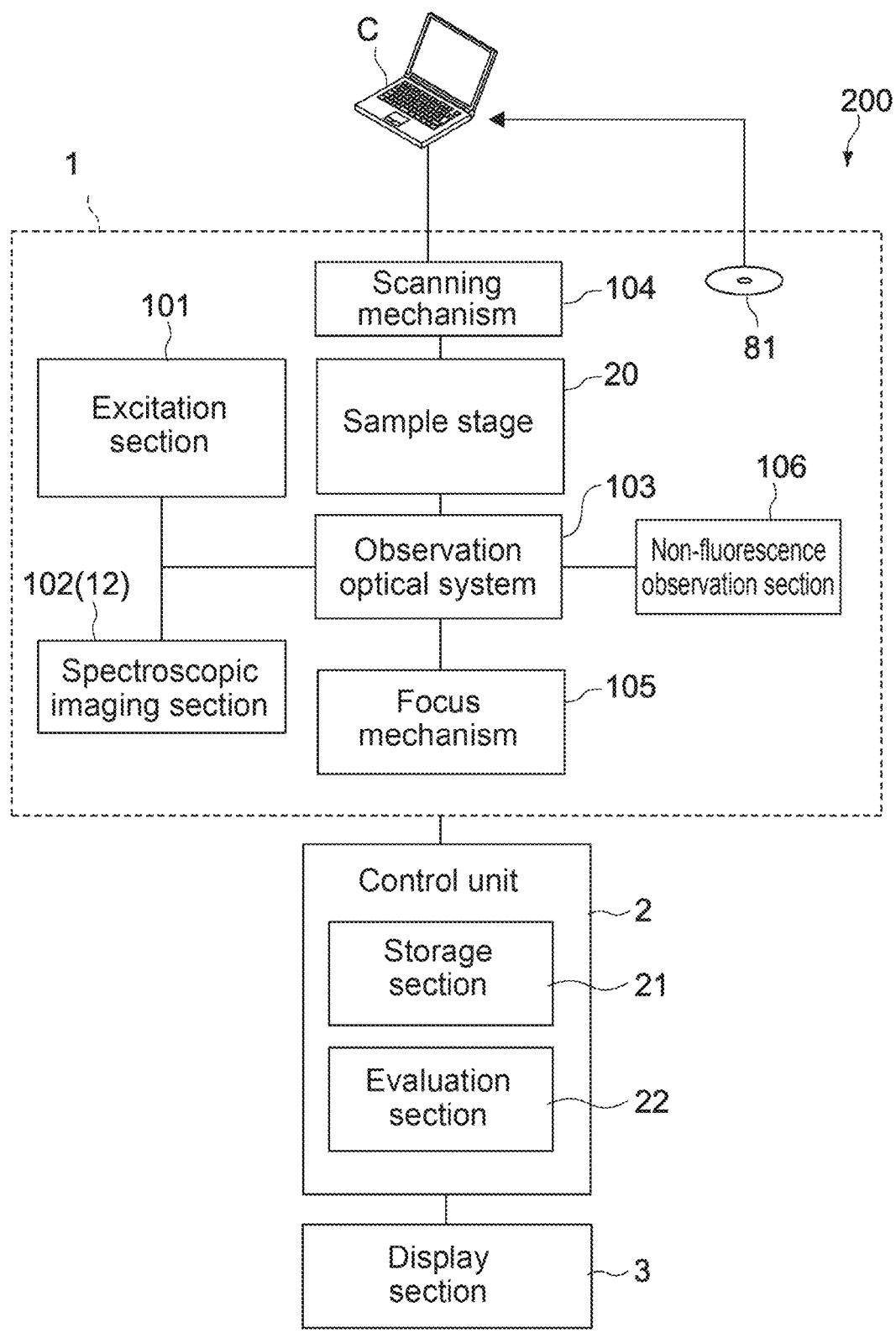
FIG. 17 is a schematic block diagram showing one modification of the fluorescence observation apparatus.
Figure 18:
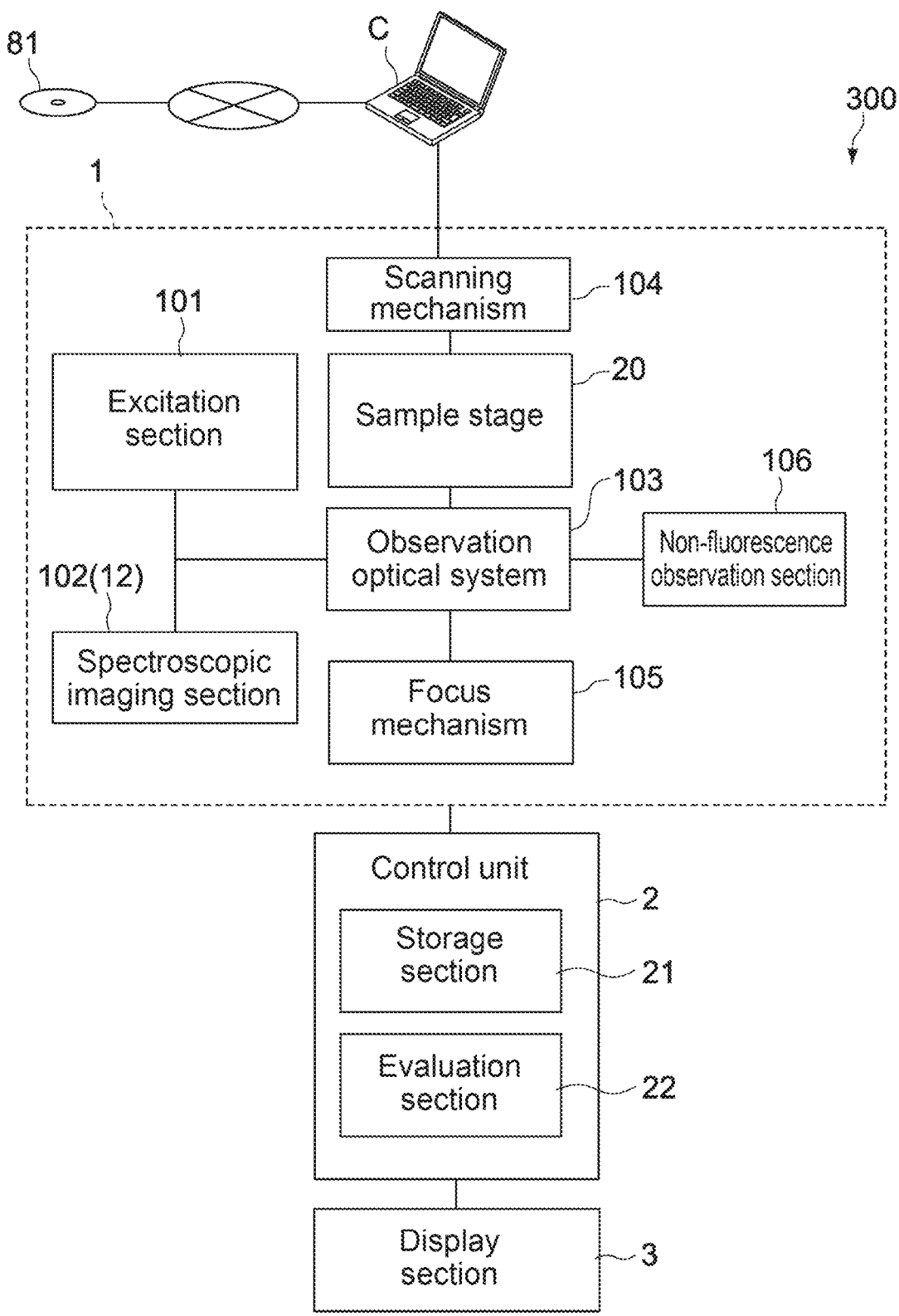
FIG. 18 is a schematic block diagram showing other modification of the fluorescence observation apparatus.

FIG. 17 is a schematic block diagram of a fluorescence observation apparatus 200 according to Modification 1, and FIG. 18 is a schematic block diagram of a fluorescence observation apparatus 300 according to Modification 2. The fluorescence observation apparatuses 200 and 300 each includes the apparatus main body 1, the control unit 2, the display section 3, and a control program 81.

The control program 81 is a program for causing the fluorescence observation apparatuses 200 and 300 to execute the same function as the control function performed by the control section 80 of the fluorescence observation apparatus 100 described above. In the fluorescence observation apparatus 200 shown in FIG. 17, the control program 81 is provided in a state of being stored in a recording medium, for example, such as a magnetic disk, an optical disk, a magneto-optical disk, or a flash memory, and is downloaded to and used by an electronic computer C or the like connected to the fluorescence observation apparatus 200.

On the other hand, in the fluorescence observation apparatus 300 shown in FIG. 18, the control program 81 distributed from outside via a network such as the Internet is downloaded to the electronic computer C or the like and used. In this case, the fluorescence observation apparatus 300 and a code used to obtain the control program 81 are packaged to be provided.

The electronic computer C in which the control program 81 is downloaded obtains various data for controlling the excitation light source 101, the spectroscopic imaging section 102, the scanning mechanism 104, the focus mechanism 105, the non-fluorescence observation section 106, and the like, and a control algorithm of the downloaded control program 81 is executed, and control conditions of the fluorescence observation apparatuses 200 and 300 are calculated. The electronic computer C issues a command to the fluorescence observation apparatuses 200 and 300 on the basis of the calculated conditions, whereby the conditions of the fluorescence observation apparatuses 200 and 300 are automatically controlled.

Although the embodiments of the present technology are described above, it goes without saying that the present technology is not limited to the above-described embodiments and various modifications can be made.

The present technology may also have the following structures.

(1) A spectroscopic imaging apparatus, including:
 a spectroscopic section that disperses incident light for each wavelength;
 an image sensor configured to be capable of setting an exposure time or a gain in a unit of a pixel, the image sensor detecting light of each wavelength dispersed in the spectroscopic section; and
 a control unit configured to be capable of setting the exposure time or the gain of the image sensor in a unit of a predetermined pixel area.

(2) The spectroscopic imaging apparatus according to (1), in which
 the spectroscopic section is configured to disperse the incident light in one axial direction for each wavelength, and
 the control unit is configured to set the exposure time or the gain of the image sensor in a unit of a line perpendicular to the one axial direction.

(3) The spectroscopic imaging apparatus according to (1) or (2), in which
 the image sensor includes a pixel section and a calculation section that calculates a pixel value from image data output from the pixel section, and
 the control unit is configured to set the gain used for calculating the pixel value in the unit of the predetermined pixel area.

(4) The spectroscopic imaging apparatus according to any one of (1) to (3), in which
 the control unit includes an evaluation section that obtains an emission spectrum of the incident light on a basis of an output of the image sensor, and a storage section that stores a plurality of reference component spectra and an autofluorescence spectrum, and
 the evaluation section is configured to calculate a component ratio of the emission spectrum such that a linear sum of a plurality of the reference component spectra and the autoluminescence spectrum is obtained.

(5) The spectroscopic imaging apparatus according to (4), in which
 the evaluation section is configured to calibrate at least one of the emission spectrum or the component spectra on a basis of the exposure time or the gain set for each predetermined pixel area.

(6) The spectroscopic imaging apparatus according to (5), in which
 the evaluation section is configured to determine whether or not there is a pixel whose pixel value reaches saturation from the captured spectrum, and exclude the pixel reaching the saturation from calculation of a component ratio of the captured spectrum.

(7) A fluorescence observation apparatus, including:
 a stage capable of supporting a fluorescence stained pathological specimen;
 an excitation section that irradiates the pathological specimen on the stage with line illumination;
 a spectroscopic section that disperses the fluorescence excited by the line illumination for each wavelength;
 an image sensor configured to be capable of setting an exposure time or a gain in a unit of a pixel, the image sensor detecting light of each wavelength dispersed in the spectroscopic section; and
 a control unit configured to set the exposure time or the gain of the image sensor in a unit of a predetermined pixel area.

(8) The fluorescence observation apparatus according to (7), further including:
 a display section for displaying the fluorescence spectrum on a basis of an output of the image sensor.

(9) The fluorescence observation apparatus according to (8), in which
 the display section has an operation area for receiving an input of an exposure time or a gain in the unit of the predetermined pixel area.

(10) The fluorescence observation apparatus according to (8) or (9), in which
 the display section has a display area for displaying a spectrum and a histogram after setting on a basis of the exposure time or the gain set.

REFERENCE SIGNS LIST 2 control unit
3 display section
10 spectroscopic imaging apparatus
11 spectroscopic section
12 detection section
13 fluorescence excitation section
20 stage
21 storage section
22 evaluation section
30 pixel section
31 calculation section
100, 200, 300 fluorescence observation apparatus
121 image sensor

The invention claimed is:

1. A spectroscopic imaging apparatus, comprising:
 a spectroscopic section that disperses incident light for each wavelength;
 an image sensor configured to be capable of setting an exposure time or a gain in a unit of a pixel, the image sensor detecting light of each wavelength dispersed in the spectroscopic section; and
 a control unit configured to be capable of setting the exposure time or the gain of the image sensor in a unit of a predetermined pixel area wherein
 the image sensor includes a pixel section and a calculation section that calculates a pixel value from image data output from the pixel section, and
 the control unit is configured to set the gain used for calculating the pixel value in the unit of the predetermined pixel area.

2. The spectroscopic imaging apparatus according to claim 1, wherein
 the spectroscopic section is configured to disperse the incident light in one axial direction for each wavelength, and the control unit is configured to set the exposure time or the gain of the image sensor in a unit of a line perpendicular to the one axial direction.

3. The spectroscopic imaging apparatus according to claim 1, wherein the control unit includes an evaluation section that obtains an emission spectrum of the incident light on a basis of an output of the image sensor, and a storage section that stores a plurality of reference component spectra and an autofluorescence spectrum, and the evaluation section is configured to calculate a component ratio of the emission spectrum such that a linear sum of a plurality of the reference component spectra and the autoluminescence spectrum is obtained.

4. The spectroscopic imaging apparatus according to claim 3, wherein the evaluation section is configured to calibrate at least one of the emission spectrum or the component spectra on a basis of the exposure time or the gain set for each predetermined pixel area.

5. The spectroscopic imaging apparatus according to claim 4, wherein the evaluation section is configured to determine whether or not there is a pixel whose pixel value reaches saturation from the captured spectrum, and exclude the pixel reaching the saturation from calculation of a component ratio of the captured spectrum.

6. A fluorescence observation apparatus, comprising: a stage capable of supporting a fluorescence stained pathological specimen; an excitation section that irradiates the pathological specimen on the stage with line illumination; a spectroscopic section that disperses the fluorescence excited by the line illumination for each wavelength; an image sensor configured to be capable of setting an exposure time or a gain in a unit of a pixel, the image sensor detecting light of each wavelength dispersed in the spectroscopic section; a control unit configured to set the exposure time or the gain of the image sensor in a unit of a predetermined pixel area; a display section for displaying the fluorescence spectrum on a basis of an output of the image sensor, wherein the display section has an operation area for receiving an input of an exposure time or a gain in the unit of the predetermined pixel area.

7. The fluorescence observation apparatus according to claim 6, wherein the display section has a display area for displaying a spectrum and a histogram after setting on a basis of the exposure time or the gain set.

* * * * *